(12) United States Patent
Keller

(10) Patent No.: US 11,117,790 B2
(45) Date of Patent: Sep. 14, 2021

(54) INDUSTRIAL TRUCK COMPRISING A THRUST DEVICE

(71) Applicant: HUBTEX MASCHINENBAU GMBH & CO. KG, Fulda (DE)

(72) Inventor: Juergen Keller, Grossenlueder (DE)

(73) Assignee: HUBTEX MASCHINENBAU GMBH & CO. KG, Fulda (DE)

( * ) Notice: Subject to any disclaimer, the term of this patent is extended or adjusted under 35 U.S.C. 154(b) by 0 days.

(21) Appl. No.: 16/603,587

(22) PCT Filed: Mar. 19, 2018

(86) PCT No.: PCT/EP2018/056797
§ 371 (c)(1),
(2) Date: Oct. 8, 2019

(87) PCT Pub. No.: WO2018/188898
PCT Pub. Date: Oct. 18, 2018

(65) Prior Publication Data
US 2020/0039802 A1    Feb. 6, 2020

(30) Foreign Application Priority Data
Apr. 10, 2017  (DE) .................... 10 2017 107 695.5

(51) Int. Cl.
| B66F 9/07 | (2006.01) |
| B66F 9/14 | (2006.01) |
| B66F 9/19 | (2006.01) |
| B66F 17/00 | (2006.01) |

(52) U.S. Cl.
CPC .................. B66F 9/07 (2013.01); B66F 9/14 (2013.01); B66F 9/195 (2013.01); B66F 17/003 (2013.01)

(58) Field of Classification Search
CPC .......... B66F 9/195; B66F 9/07; B66F 17/003
See application file for complete search history.

(56) References Cited

U.S. PATENT DOCUMENTS

| 2,709,532 | A | * | 5/1955 | Marietta |
| 3,757,899 | A | * | 9/1973 | Smith, Jr. |
| 5,876,178 | A |   | 3/1999 | Heitl |
| 2012/0315116 | A1 | * | 12/2012 | Moshe etal. |
| 2017/0334644 | A1 |   | 11/2017 | Otto et al. |

FOREIGN PATENT DOCUMENTS

| DE | 26 34 506 A1 | 2/1978 |
| DE | 30 46 027 A1 | 7/1982 |
| DE | 195 37 995 A1 | 4/1997 |
| DE | 10 2006 020 491 A | 10/2007 |
| DE | 10 2006 029 759 A1 | 1/2008 |
| DE | 10 2013 004 489 A1 | 9/2014 |
| GB | 1 339 504 A | 12/1973 |

* cited by examiner

*Primary Examiner* — Saul Rodriguez
*Assistant Examiner* — Willie Berry, Jr.
(74) *Attorney, Agent, or Firm* — Norman B. Thot

(57) ABSTRACT

An industrial truck includes a main chassis, a transport platform to transport goods, a lifting device to raise and lower the transport platform, and a pushing device with at least one actuatable pushing arm. The pushing device displaces the goods relative to the transport platform.

11 Claims, 9 Drawing Sheets

US 11,117,790 B2

INDUSTRIAL TRUCK COMPRISING A THRUST DEVICE

CROSS REFERENCE TO PRIOR APPLICATIONS

This application is a U.S. National Phase application under 35 U.S.C. § 371 of International Application No. PCT/EP2018/056797, filed on Mar. 19, 2018 and which claims benefit to German Patent Application No. 10 2017 107 695.6, filed on Apr. 10, 2017. The International Application was published in German on Oct. 18, 2018 as WO 2018/188898 A1 under PCT Article 21(2).

FIELD

The present invention relates to an industrial truck, and in particular to an order picker.

BACKGROUND

Industrial trucks or floor conveyors are used for stacking and unstacking loading units, in particular goods arranged on a pallet, and are well-known. Particular designs of industrial trucks can also be used for order picking, during which selected subsets of goods are stacked together. The storage and retrieval of subsets is generally performed manually by an operator or driver of the industrial truck.

In order to simplify the storage and retrieval of subsets for the operator, and to improve safety when working at a height, various technical proposals are known from the prior art which mainly relate to ergonomical improvements of the control station.

DE 10 2006 029 759 A1, for example, describes an order picker in which the driver's seat can be raised in order to allow an operator direct access to goods that are to be stored and/or retrieved, as well as an ergonomically favorable sitting position when driving the order picker.

A disadvantage of known industrial trucks is, however, that the storage and retrieval of individual volumes of goods by hand by the operator is still relatively time-consuming, and in particular picking orders of large components, such as door elements, is relatively awkward and strenuous. At least one additional assistant is in particular required for the purpose of handling heavy and/or large components of this kind, so that the storage and retrieval is relatively costly.

SUMMARY

An aspect of the present invention is to provide an industrial truck that improves on at least one of the above-mentioned disadvantages, and which in particular allows for a quick and uncomplicated order picking for large components.

In an embodiment, the present invention provides an industrial truck which includes a main chassis, a transport platform configured to transport goods, a lifting device configured to raise and lower the transport platform, and a pushing device comprising at least one pushing arm which is configured to be actuatable. The pushing device is configured to displace the goods relative to the transport platform.

BRIEF DESCRIPTION OF THE DRAWINGS

The present invention is described in greater detail below on the basis of embodiments and of the drawings in which.

DETAILED DESCRIPTION

Figure 1:
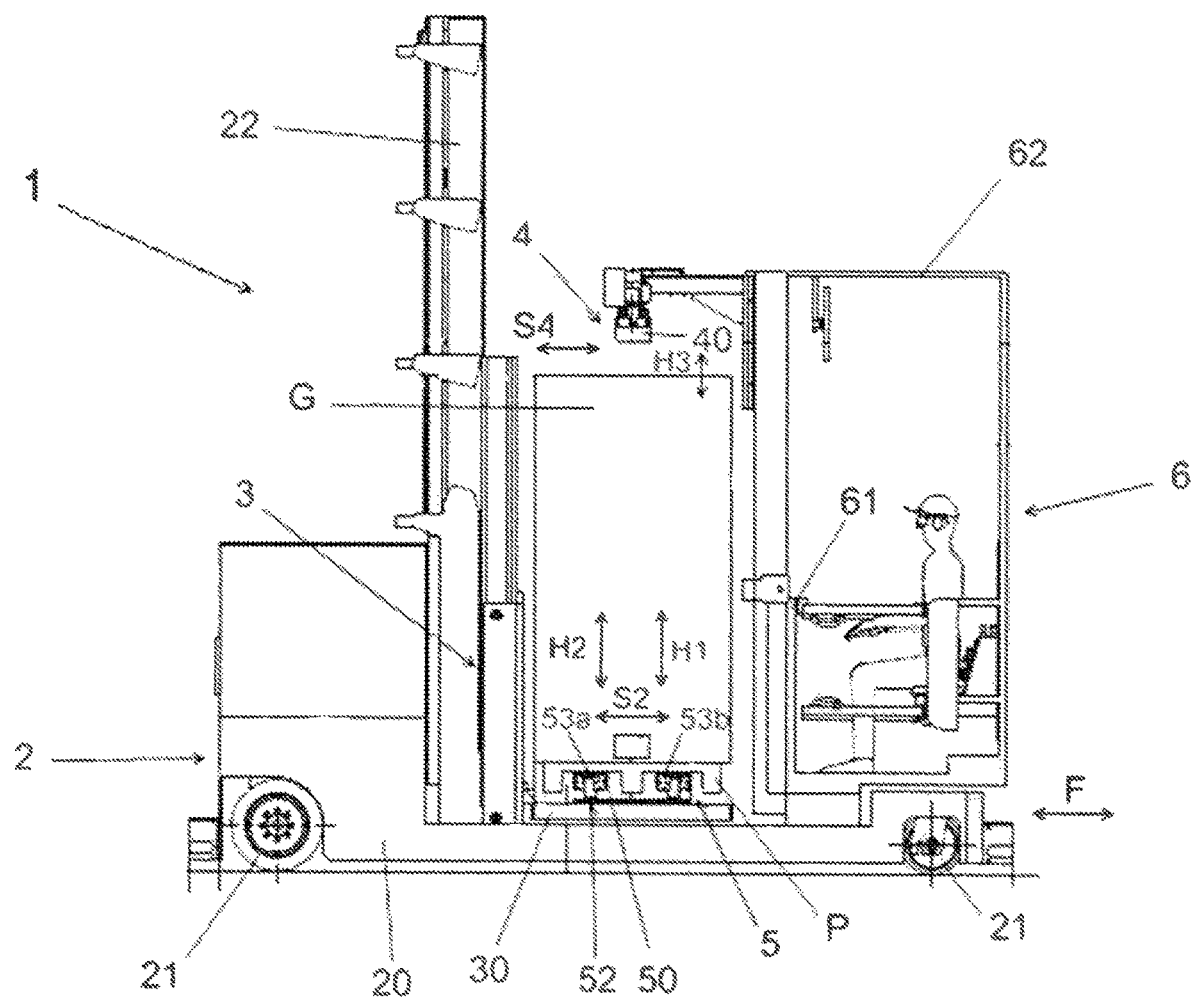
FIG. 1 shows a side view of a first embodiment of the industrial truck according to the present invention.

The industrial truck according to the present invention comprises a main chassis, a lifting device for raising and lowering a transport platform on which the in particular large goods, such as doors, can be transported, and a pushing device comprising at least one actuatable pushing arm for displacing individual goods or volumes of goods relative to the transport platform. The storage and retrieval process can thereby be simplified and accelerated in particular when picking orders of particularly large and/or heavy goods.

The main chassis comprises a body that generally rests on four wheels and is movable in a driven manner so that the industrial truck can travel and maneuver freely in particular in internal corridors, between high-level racks. The industrial truck is in principle operated in a main direction of travel that is defined in the longitudinal extension of the body and is substantially in a horizontal plane. In order to achieve significant freedom of movement of the industrial truck during travel, all the wheels of the industrial truck can be mounted so as to be pivotable about steer angles of at least 90°, for example, at least 180°, for example, 360°. Alternatively or in addition thereto, the main chassis, in particular in the case of travel between two walls of racks, may be rail-bound or groove-bound, and thus reliably guided in terms of movement. At least one lifting mast or lifting frame is arranged on the main chassis, which mast or frame extends substantially in the vertical direction. The lifting device for the transport platform is arranged on the lifting mast.

The lifting device in particular comprises the transport platform which can be raised and lowered along the lifting mast. The transport platform may be formed as a substantially horizontal surface on which the goods to be transported can be placed. The goods may in this case be stored on a transport pallet or picked directly on the transport platform without transport aids. In particular in the latter case, the transport platform may also function as a work platform that can be occupied by the operator of the industrial truck. The loading and unloading of the transport platform takes place in particular to the side, transversely to the main direction of travel of the industrial truck. In order to simplify the loading and unloading process, the transport platform can, for example, have no or an adjustable side boundary on the side of the rack so that components can be directly pulled out of a rack bay and onto the transport platform, or pushed directly from the transport platform into a rack bay. The industrial truck comprises a pushing device to simplify and accelerate this work step.

The pushing device is used for displacing the goods towards the transport platform or downwards from the transport platform. In particular in the case of picking orders of large goods, such as doors, which goods can be stacked so that the flat sides thereof are on top of one another, after the industrial truck has approached the corresponding rack bay, the pushing device can push one or more large parts simultaneously from the rack bay onto the transport platform or from the transport platform into the rack bay, in a relatively simple manner. The at least one movable pushing arm is used for this purpose, which arm can, for example, be actuated from the main control station of the industrial truck so that manual intervention by the operator during the storage and retrieval step is not necessary. The pushing device is advantageously suitable for displacing the goods in the two opposing directions, transversely to the main direction of travel of the industrial truck, towards the transport platform or downwards from the transport platform. The storage and retrieval of the goods can thereby take place on two sides of the industrial truck so that the goods can be stored or retrieved at both sides of the industrial truck, i.e., at both racks, in particular when the industrial truck is operated in a corridor between two racks. It may in addition be advantageous for the pushing device to comprise two pushing arms which are arranged in particular horizontally and side-by-side, for example, in order to prevent slippage when displacing the goods, and to thus provide a safe displacement. The goods can also be aligned and rotated, in part, in the displacement direction thereof, via two pushing arms that can be actuated independently of one another. The entire displacement process of the goods can advantageously take place in a fully automatic manner.

The pushing arm can, for example, be arranged to be displaceable at least in the direction of the longitudinal extension thereof, and/or is designed to be length-adjustable in the direction of the longitudinal extension thereof. The pushing arm is generally arranged so that the longitudinal extension thereof is transverse to the main direction of travel of the industrial truck, so that the pushing arm is designed to be displaceable and/or length-adjustable in particular in the direction transverse to the main direction of travel of the industrial truck. The pushing arm is essentially designed as a bar, one of the end face surfaces of which can strike against the goods in order to displace the goods, and can then push the goods forwards, for example, in a linear manner. The forces acting on the pushing arm in the process are therefore directed substantially in the longitudinal extension of the pushing arm. Undesired bending and/or torsional moments can thereby be minimized on the pushing arm. The force required for the displacement can also be reduced so that the pushing device has a particularly reduced weight overall, and can thus be constructed in a cost-effective manner. The pushing arm can, for example, be mounted to also be displaceable in the horizontal direction, transversely to the longitudinal extension thereof, i.e., in the main direction of travel of the industrial truck in the example mentioned above. The desired contact point of the pushing arm on the goods can thereby be approached in a particularly exact manner, thereby preventing slippage of the goods during displacement and making possible to provide that the goods are reliably pushed into or out of the rack bay. The change in the length of the pushing arm can be achieved, for example, by shifting of a lever arm or an adjustment lever, and a resulting displacement of two segments of the pushing arm, in the longitudinal extension.

The pushing arm can, for example, be arranged above the transport platform, for example, also above the goods to be transported in each case. The pushing arm can thereby be displaced without the freedom of movement thereof being restricted by the goods. In order to displace goods, the pushing arm can come into contact with a side edge of corresponding goods to displace the goods. As a result, when picking orders of stacked goods, such as door elements, the topmost goods item of a stack of goods can in each case be picked. The goods item located on the top of a stack of goods can in particular be displaced from the transport platform or onto the transport platform, so that the remaining goods stacked on the transport platform or in a rack bay under the goods item to be stored or retrieved can remain in the position thereof.

In order to allow for displacement of goods in both longitudinal directions of the pushing arm, the pushing arm can, for example, comprise a pusher dog. The pusher dog can, for example, be designed as a push plate and comprise at least one planar face via which the pusher dog can be brought into contact with the goods for the displacement thereof. For this purpose, the pusher dog can, for example, protrude laterally from the pushing arm, in particular transversely to the longitudinal extension of the pushing arm, in the direction of the transport platform, so that, for example, in the event of a return displacement of the pushing arm, the pusher dog can engage behind a goods item and push the goods in the direction of the formation of the pushing arm. The pusher dog can, for example, be arranged on one of the end faces of the pushing arm. It is advantageously also possible for a pusher dog to be arranged in each case on both end faces of the pushing arm. The pusher dog may be rigidly connected to the pushing arm so that the pushing arm or the pusher dog can absorb particularly high forces and is in particular suitable for displacing large or heavy goods. The pusher dog may alternatively be designed so that the pusher dog can be extended from or folded out of a recess in the pushing arm. As a result, only a relatively small distance or air space is required between a goods item and an adjacent object above or to the side of the goods item, such as a neighboring rack base, a building or rack ceiling, a wall or other goods, in order for it to be possible to extend the pushing arm along the goods to be retrieved, as far as a rear face of the goods. This allows for a particularly space-saving storage of the goods. Particularly efficient and space-saving use can be made of the height of a rack bay or a warehouse as a result. In an embodiment, the pushing arm can, for example, always be arranged above the goods to be transported, the pusher dog protruding downwards, in the direction of the goods. In an alternative embodiment, the pushing arm can, for example, be arranged laterally with respect to the goods to be transported, the pusher dog protruding laterally, in the direction of the goods. Advantages result for the relevant embodiment depending on the design of the goods to be transported and of the rack system.

The pushing device can, for example, comprise at least one caster or roller, to which the pushing arm is connected and which is arranged above the transport platform or above an upper face of a goods item, and can roll thereon, when the pushing arm is displaced. The caster may be mounted on a shaft, in particular to be freely rotatable, the shaft being arranged to be height-adjustable. The shaft may, for example, be guided in a vertical slot so that the shaft is freely displaceable in the vertical direction. The shaft can thereby be positioned or the height thereof can thereby be arranged automatically, depending on the height of a goods item or a stack of goods located on the transport platform. An end face end of the pushing arm, in particular the end face end that is opposite the end face end on which the pusher dog is arranged, can, for example, be fastened to the shaft so as to be freely rotatable. As a result, the pushing arm is always arranged above the transport platform or the goods, and can roll along on the upper face of the transport platform or of the goods, via the caster, in the event of displacement. The caster functions as a support for the pushing arm in this case. The pushing arm can advantageously be raised when the shaft is rotated, for example, by a pin arranged on the shaft engaging on the pushing arm. It is thereby possible to prevent the pushing arm from dragging on the goods when the pushing arm is displaced or lengthened. The pushing arm can furthermore be positioned particularly exactly at a desired jib height as a result.

The pushing device can, for example, be designed to be movable, in particular displaceable, relative to the main chassis and/or relative to the transport platform, both in the vertical and in the horizontal direction, in particular transversely to the main direction of travel of the industrial truck. The height of the pushing arm as well as the lateral offset thereof with respect to the transport platform or to a goods item can consequently be adjusted. The pushing arm can therefore be positioned particularly exactly, according to the structure height of one or more stacked goods, in order to displace a goods item.

The transport platform can, for example, comprise a shifting device for shifting the goods relative to the transport platform. The goods to be transported can be shifted on the transport platform into a position advantageous for transport as a result. The shifting device can also be used for storing or retrieving the goods on a rack bay.

The shifting device can, for example, comprise an initial lifting device for raising and lowering the goods relative to the transport platform, and/or a support rail device for laterally relocating the goods relative to the transport platform. The initial lifting device allows for an additional lift of the transported goods, referred to as the initial lift, with respect to the height of the transport platform achieved by the lifting device, in particular in the case of storage or retrieval of goods. The goods can, for example, therefore also be stored in or retrieved from rack bays where a direct approach by the transport platform is not possible. This is the case, for example, in the event of rack bays that are arranged just below a warehouse ceiling and the lift of the transport platform is restricted, for example, by a part of the industrial truck that rises at the same time, such as a lifting mast or canopy of the control station. The initial lifting device therefore makes it possible for particularly efficient use to be made of the warehouse height. The support rail device may be formed as part of the initial lifting device and can in particular be formed by a movable base on which the goods or a pallet rests.

The support rail device can, for example, comprise at least one support rail that is arranged to be displaceable and/or is designed to be length-adjustable in at least one substantially horizontal direction, in particular in both directions, transversely to the main direction of travel of the industrial truck. The at least one support rail is in particular displaceable relative to the transport platform, the goods, or the pallet to be transported resting on the support rail.

The support rail device can, for example, comprise two support rails that are arranged to be mutually parallel in a plane, thereby providing a reliable handling of the goods or of the pallet. The support rails may each be designed as an extendible telescopic fork or as a telescopic table, and the longitudinal extension thereof can be displaced or adjusted in length in each case, for example, in two opposing directions. The goods arranged on the at least one support rail can thereby be stored in a rack or retrieved from a rack on both sides of the transport platform or of the industrial truck.

At least one control station can, for example, be provided on the industrial truck, which control station is arranged to be height-adjustable relative to the main chassis and/or relative to the transport platform. The control station can, for example, be arranged on the lifting mast of the main chassis to be height-adjustable. In a further embodiment of the present invention, more than one control station can, for example, also be provided. It is possible, for example, for two controls stations to be arranged on the industrial truck, which are each laterally adjacent to the transport platform, and opposite one another in the main direction of travel of the industrial truck. The industrial truck can thereby be operated by two people and a particularly quick picking of orders of goods can thus take place.

A railing can, for example, be arranged between the control station and the transport platform, which railing is height-adjustable relative to the control station. The railing can, for example, be lowerable by at least 400 mm. This makes it possible for an operator to grip in the region of the transport platform in a relatively simple manner, for example, during storage, retrieval or picking of orders of goods, in order to manually shift the adjustment lever for adjusting the length of the pushing arm.

The transport platform can, for example, be suitable for receiving large goods. The goods are in particular door elements. The door elements may be stacked so that flat faces thereof are on top of one another, so that it is possible for the industrial truck to pick the door, or a pallet comprising a plurality of stacked doors, that is on the top of a stack in each case.

Embodiments of the present invention will be explained in greater detail below under reference to the drawings.

The industrial truck 1 shown schematically in the drawings in each case is in particular intended for internal use and is in particular used as an order picker for the storage and retrieval of goods G stacked on a pallet P and for picking orders of individual goods G in a high-bay warehouse L. In the present case, the goods G are shown by dashed lines, in part, and, in the examples shown are door elements which, owing to their size and weight, place particular demands on storage, retrieval and/or order picking, which demands can be met using the industrial truck 1 according to the present invention.

Figure 2:
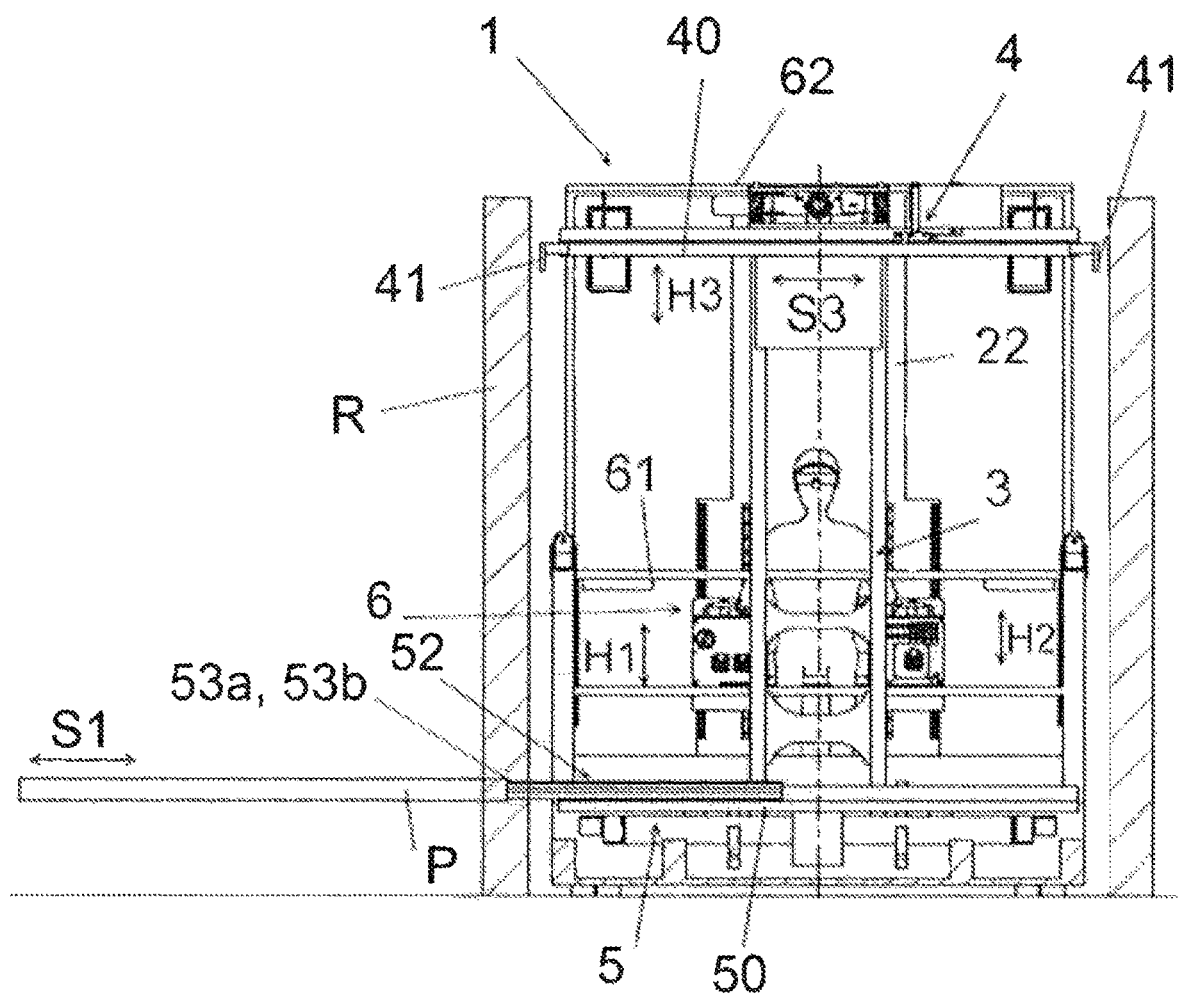
FIG. 2 shows a back view of the first embodiment of the industrial truck according to the present invention.
Figure 3:
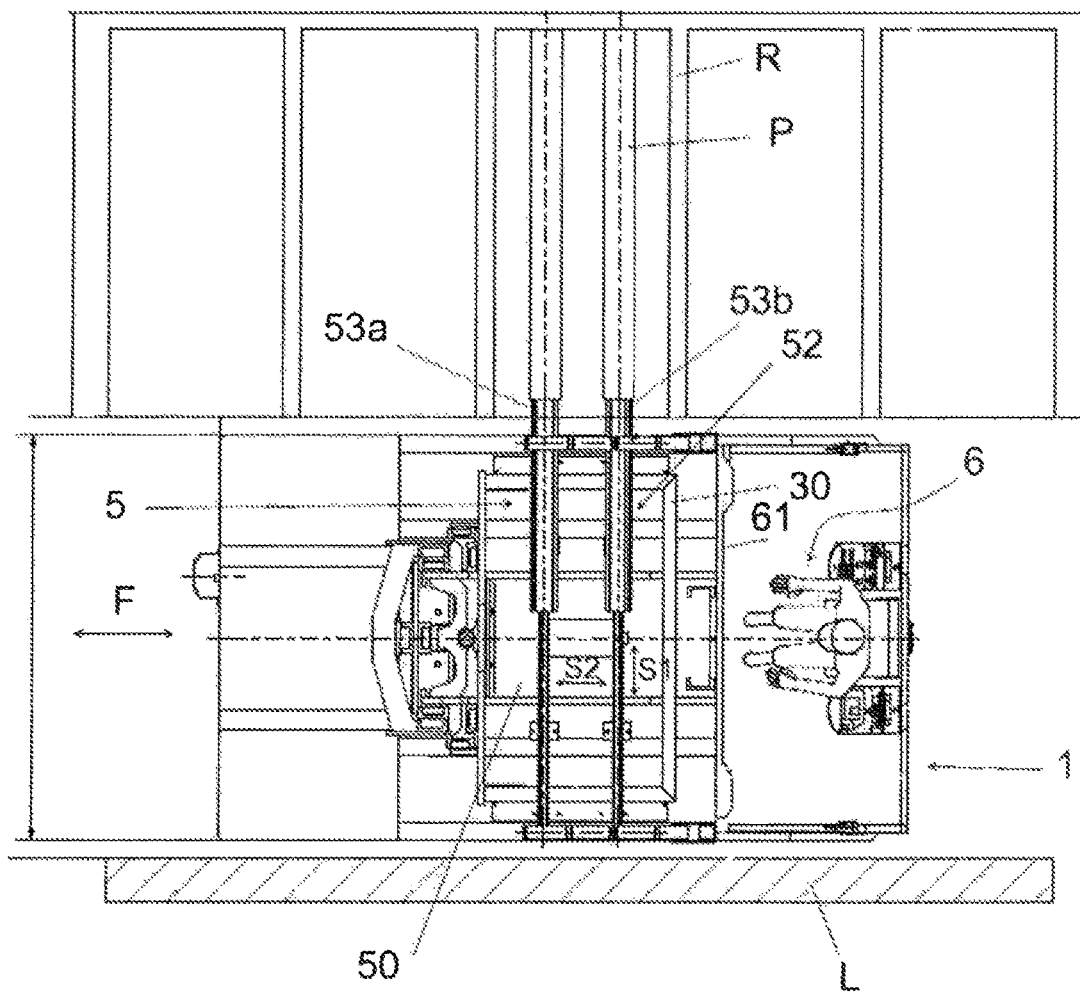
FIG. 3 shows a top view of the first embodiment of the industrial truck according to the present invention.
Figure 4:
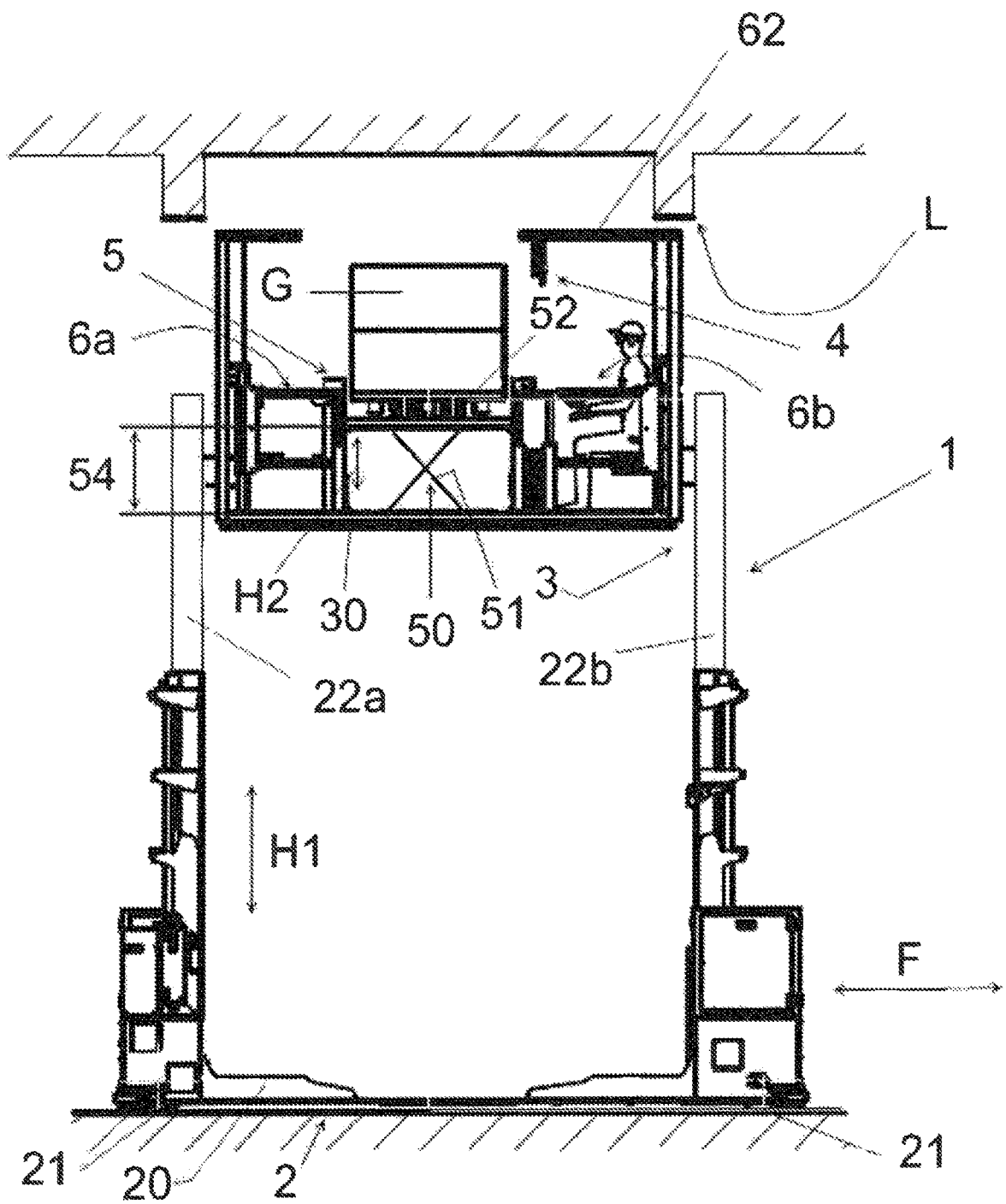
FIG. 4 shows a second embodiment of the industrial truck according to the present invention during storage/retrieval of goods using the initial lifting device.

The industrial truck 1 is designed in substantially the same manner in all the drawings, the only difference between the first embodiment of the industrial truck 1 shown in each of FIGS. 1-3, and the second embodiment of the industrial truck 1 shown in FIG. 4, being the number of control stations 6, 6*a*, 6*b* and the lifting masts 22, 22*a*, 22*b*.

FIGS. 1 and 4 are each side views of an industrial truck 1 according to the present invention. The industrial truck 1 comprises a main chassis 2 having a body 20 that, in the present case, is guided on four wheels 21. The main directions of travel of the industrial truck 1 are in the horizontal of the image plane in each of FIGS. 1 and 4, indicated by the arrows denoted F. The body 20 comprises at least one lifting mast 22, 22*a*, 22*b*, on which a lifting device 3 for raising or lowering a transport platform 30 extends, indicated by the arrows denoted H1. For the purpose of storage and retrieval of goods G, the industrial truck 1 is intended to be able to be moved in the main direction of travel F through a corridor that is delimited laterally in each case by a rack front having rack bays R that are open towards the corridor, as can be seen, for example, in the front view of the industrial truck 1 shown in FIG. 2 and in the plan view of the industrial truck 1 shown in FIG. 3.

FIG. 4 shows a development of the industrial truck 1 according to the present invention comprising a first control station 6a and a second control station 6b. The control stations 6a, 6b are each arranged to be laterally adjacent to the transport platform 30 and opposite one another, on a front and tail end of the industrial truck 1. The two control stations 6a, 6b can be raised and lowered together with the transport platform 30, along a lifting mast 22a, 22b. The possibility of dividing the operation of the industrial truck 1 and the picking of orders of the goods G between two operators allows for particularly quick and simplified storage or retrieval and/or picking of orders of goods G. Furthermore, in the case of goods G that are particularly difficult to move, for example, in the event of slippage of a goods item G, manual intervention by an operator may take place. For this purpose, it is intended that a railing 61, which is arranged between the control station 6, 6a, 6b and the transport platform 30 in each case, can be lowered.

The transport platform 30 is substantially formed by a horizontal plate on which the goods G can be placed and transported, with or without a pallet P. FIGS. 1-3 each show the transport platform 30 in a lowered state, and FIGS. 4-9 show the transport platform 30 in a raised state. In order to allow for loading and unloading of the transport platform 30, the transport platform 30 is freely accessible from the outside, without any limitation, at least on one side of the industrial truck 1. Goods G can thereby be stored or retrieved in particular in the case of rack bays R that are located to the side of the industrial truck 1, as can in particular be seen in FIGS. 2, 3 and 5-9. In the present example, a shifting device 5 for shifting the goods G relative to the transport platform 30 is integrated in the transport platform 30.

The shifting device 5 comprises an initial lifting device 50 and a support rail device 52 which, in the present case, comprises two support rails 53a, 53b. The shifting device 5 is to shift the goods G or a pallet P relative to the transport platform 30, in particular for storage and retrieval of goods G stacked on a pallet P. This is in particular achieved by raising, displacing and lowering the support rails 53a, 53b.

The initial lifting device 50 allows for raising and lowering of the goods G relative to the transport platform 30, as is shown by the arrows denoted H2. The initial lifting device 50 can essentially comprise a scissors lifting mechanism 51 that is known per se and via which the entire support rail device 52 can be raised and/or lowered, at least relative to the transport platform 30. The goods G or a pallet P can thereby be additionally raised relative to the transport platform 30 by an additional lift, i.e., the initial lift 54. As a result, it is also possible to operate rack bays R which are arranged, for example, directly under a ceiling of a building L and which the transport platform 30 cannot approach directly, for the purpose of storage and/or retrieval, owing to an upwardly protruding component of the industrial truck 1, such as a canopy 62 of the control station 6, 6a, 6b, as is shown, for example, in FIG. 3.

In FIG. 4, the transport platform 30, together with the two control stations 6a, 6b, is raised into a maximum lift position that is limited by the ceiling of the building L. The support rails 53a, 53b are raised relative to the transport platform 30 by the initial lift 54 to make it possible to reach a rack bay R, and to thereby store or retrieve goods G which is arranged higher up with respect to the transport platform 30.

The support rails 53a, 53b are arranged so that at least the longitudinal extension thereof is displaceable in the directions S1, relative to the transport platform 30. As a result, the goods G or pallet P raised by the support rails 53a, 53b can be pushed into and deposited in the rack bay R that is located to the side of the industrial truck 1, or be raised within the rack bay R and shifted in the direction of the transport platform 30 and deposited there, for the purpose of retrieval. Such storage and/or retrieval of a pallet P is shown, for example, in FIGS. 1-3, the guide rails 53a, 53b being shown in an extended state in this case.

While the support rails 53a, 53b are used for the purpose of storage and retrieval of goods G stacked on a pallet P, an actuatable pushing device 4 is provided for automatic picking of orders of individual goods G into or from the rack R.

The pushing device 4 is arranged above the transport platform 30 and comprises a pushing arm 40 that is designed to be displaceable and length-adjustable in the direction of the longitudinal extension thereof. The pushing arm 40, just like the support rails 53a, 53b, can in particular be displaced laterally with respect to the industrial truck 1, as is indicated by the arrows denoted S3. The functions of the pushing arm 40 can be actuated from the control station 6, 6a, 6b so that order picking can take place in a fully automatic manner. In particular, after the industrial truck 1 has approached a corresponding rack bay R, a single or a plurality of goods G can be pushed from the rack bay R onto the transport platform 30, or from the transport platform 30 into the rack bay R, in a relatively simple manner, using the pushing arm 40 of the industrial truck without the goods G to be displaced needing to be raised separately.

For this purpose, the pushing arm 40 comprises a pusher dog 41 which is arranged on an end face of the pushing arm 40 and which is designed as a push plate. The pusher dog 41 protrudes from the pushing arm 40 in the direction of the transport platform 30 so that the pushing arm 40 can be extended above or to the side of goods G as far as possible without contact, and the pusher dog 41 thereof comes into contact with the goods G after being lowered and in part retracted again, and pushes along the goods G in the direction of the transport platform 30, during the further displacement of the pushing arm 40. The pusher dog 41 is in particular rigidly fastened to the pushing arm 40 so that it is possible to in particular pick orders of large or heavy goods G, such as doors.

The order picking process will be explained in greater detail again below under reference to FIGS. 5-9.

FIGS. 5-9 are each cutaway front views of the industrial truck 1 for picking orders of planar, stacked goods G, such as door elements. The door elements are shown in part in dashed lines in this case.

Figure 5:
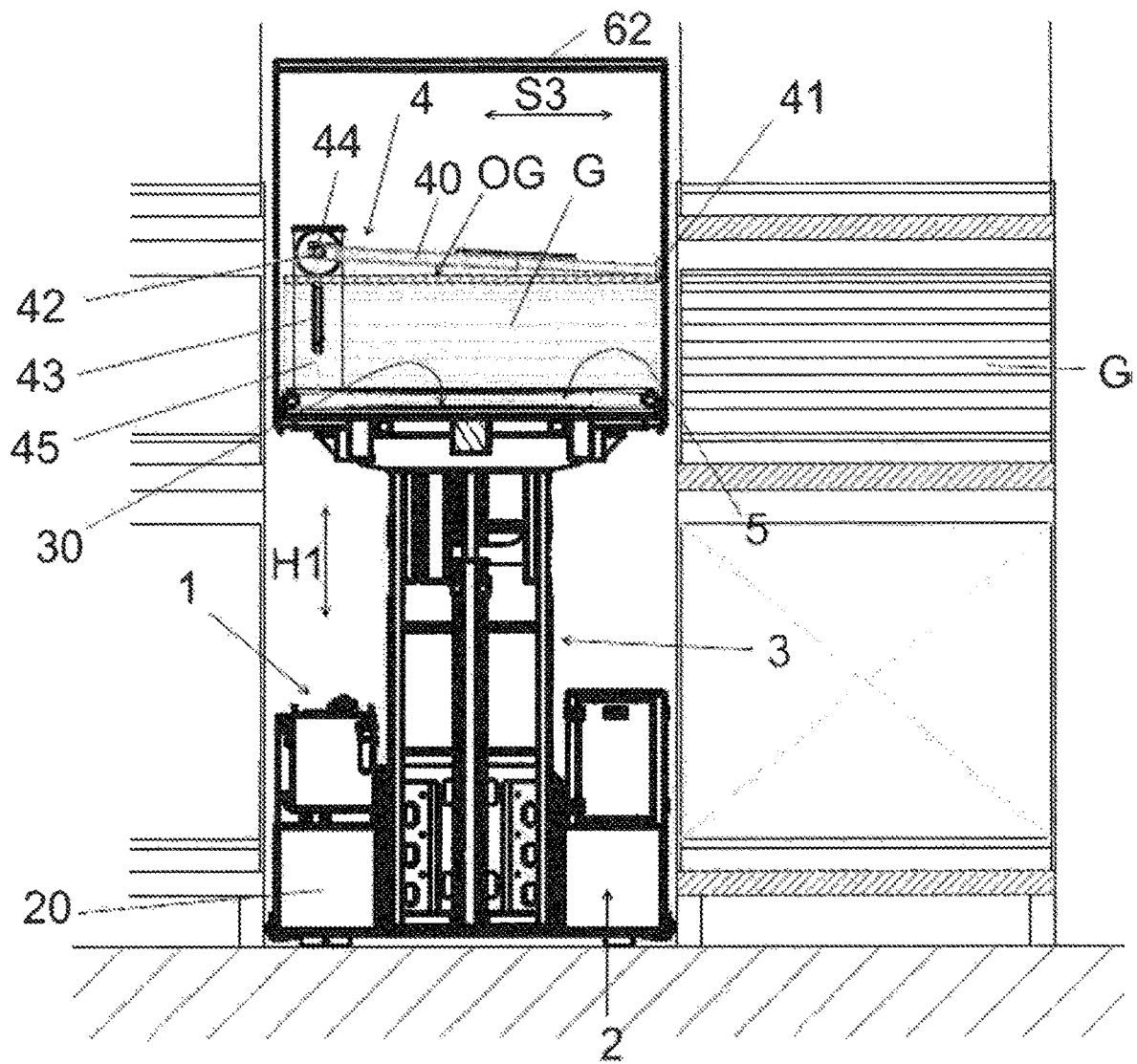
FIG. 5 shows the industrial truck during storage/retrieval of goods using the pushing device.

In FIG. 5, door elements that have already been retrieved or picked are located on the transport platform 30, on which door elements a further door element is intended to be stacked. The transport platform 30 approaches or is raised to a corresponding rack bay R so that the upper face of a door element stacked uppermost on the transport platform 30 and the lower face of a door element stacked uppermost in the rack bay R are substantially in one plane.

A caster 42 rests on the top of the door element that is stacked uppermost on the transport platform 30. The caster 42 is arranged on a rotatably mounted shaft 44 so as to be freely rotatable. The shaft 44 is mounted on an actuator 45 arranged to the side of the transport platform 30, and which is in particular mounted to be freely displaceable in a vertical slot 43. The shaft 44 can thereby be positioned vertically or the height thereof can be arranged automatically, depending on the door elements stacked on the transport platform 30. The shaft 44 is connected to the pushing arm 40. The pushing arm 40 is in particular fastened to the shaft 44 via an end face end, so as to be freely rotatable.

Figure 6:
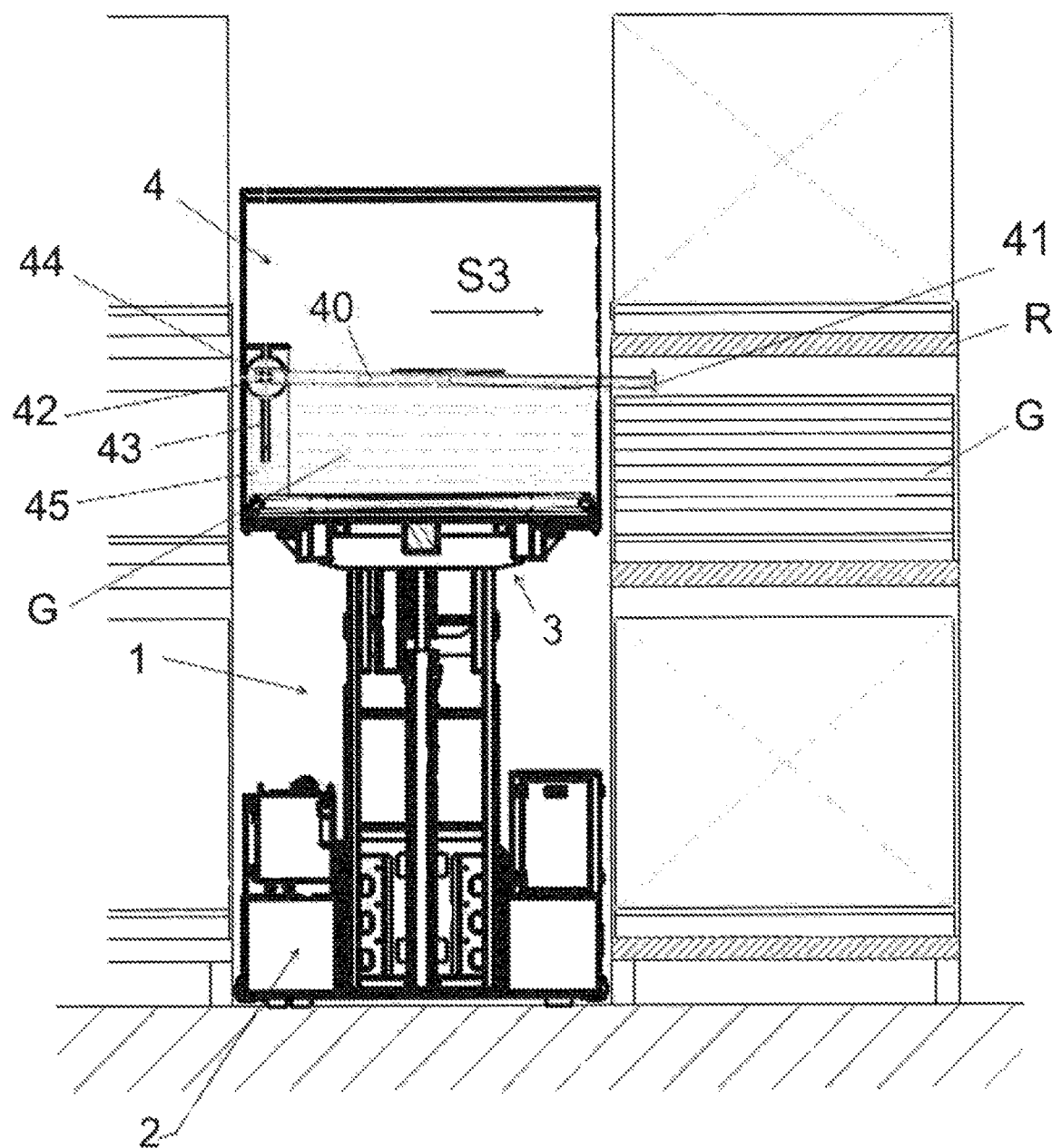
FIG. 6 shows the industrial truck during storage/retrieval of goods using the pushing device.

The pushing arm 40 is then manually or automatically lengthened in the direction of the longitudinal extension thereof, as can be seen in FIG. 6. The lengthening takes place in particular by pushing out an overlapping portion of the pushing arm 40.

Figure 7:
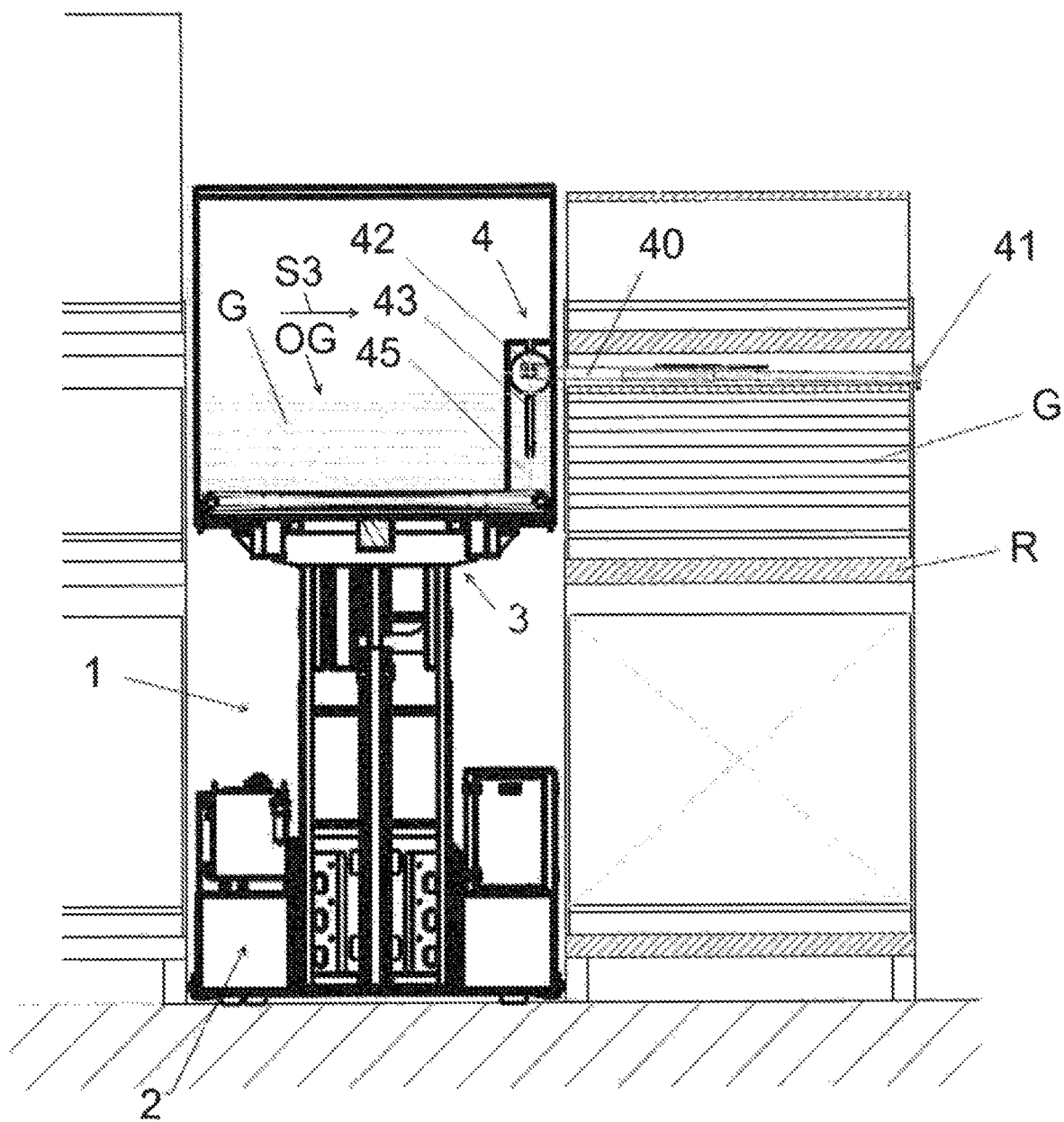
FIG. 7 shows the industrial truck during storage/retrieval of goods using the pushing device.

FIG. 7 shows the way in which the pushing arm 40 is displaced in the direction of the rack bay R by displacement of the actuator 45, and the pusher dog 41 thereof engages, from above, behind the door element stacked uppermost in the rack bay R. During displacement, the roller 42 rolls along the surface of the door element that is stacked uppermost on the transport platform 30, while the pusher dog 41 and/or the pushing arm 40 are raised slightly, for example, by rotating the shaft 44, in order not to drag or jam on the door elements during displacement. The jib height of the pushing arm can also be set particularly exactly as a result.

Figure 8:
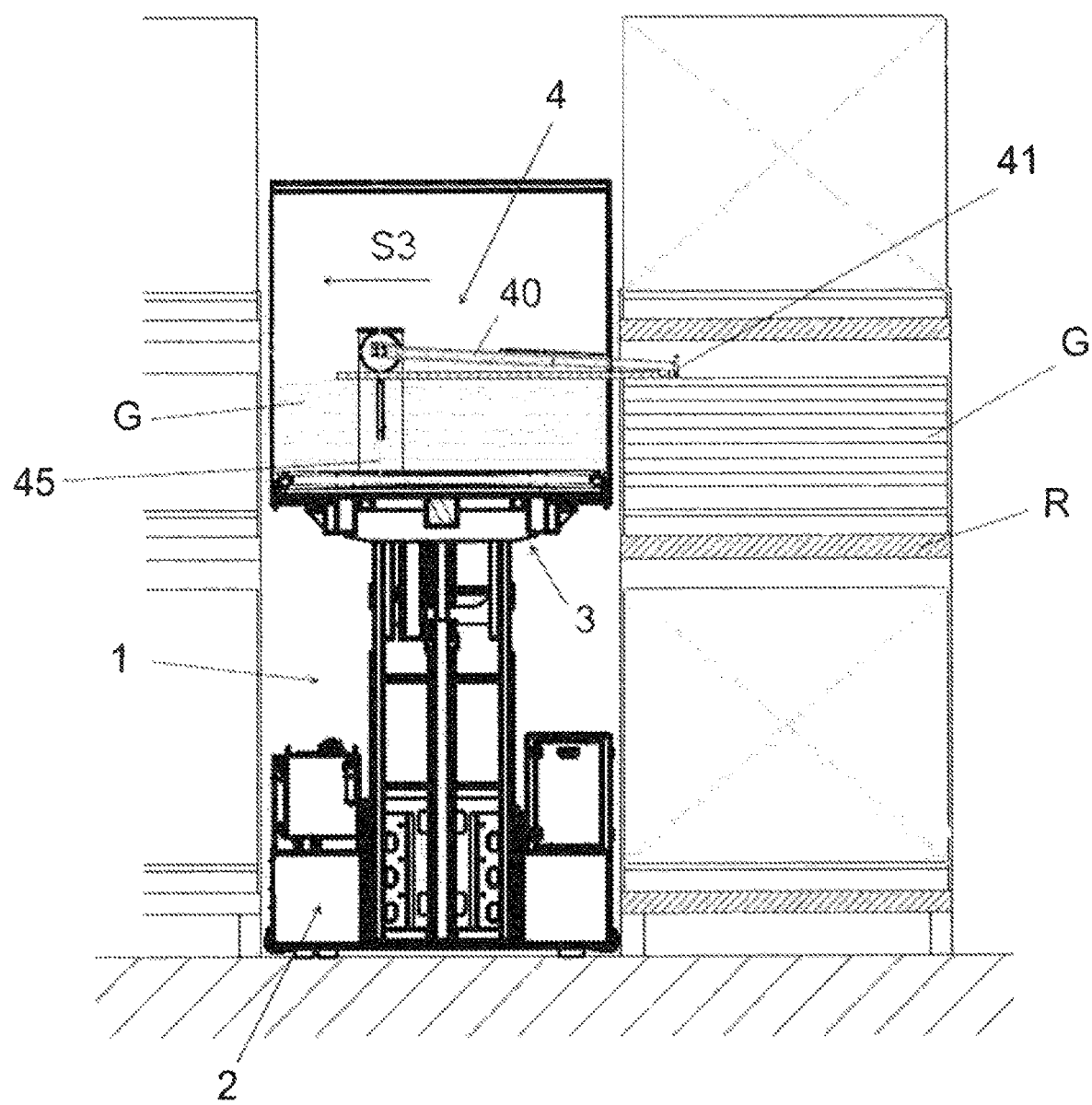
FIG. 8 shows the industrial truck during storage/retrieval of goods using the pushing device.
Figure 9:
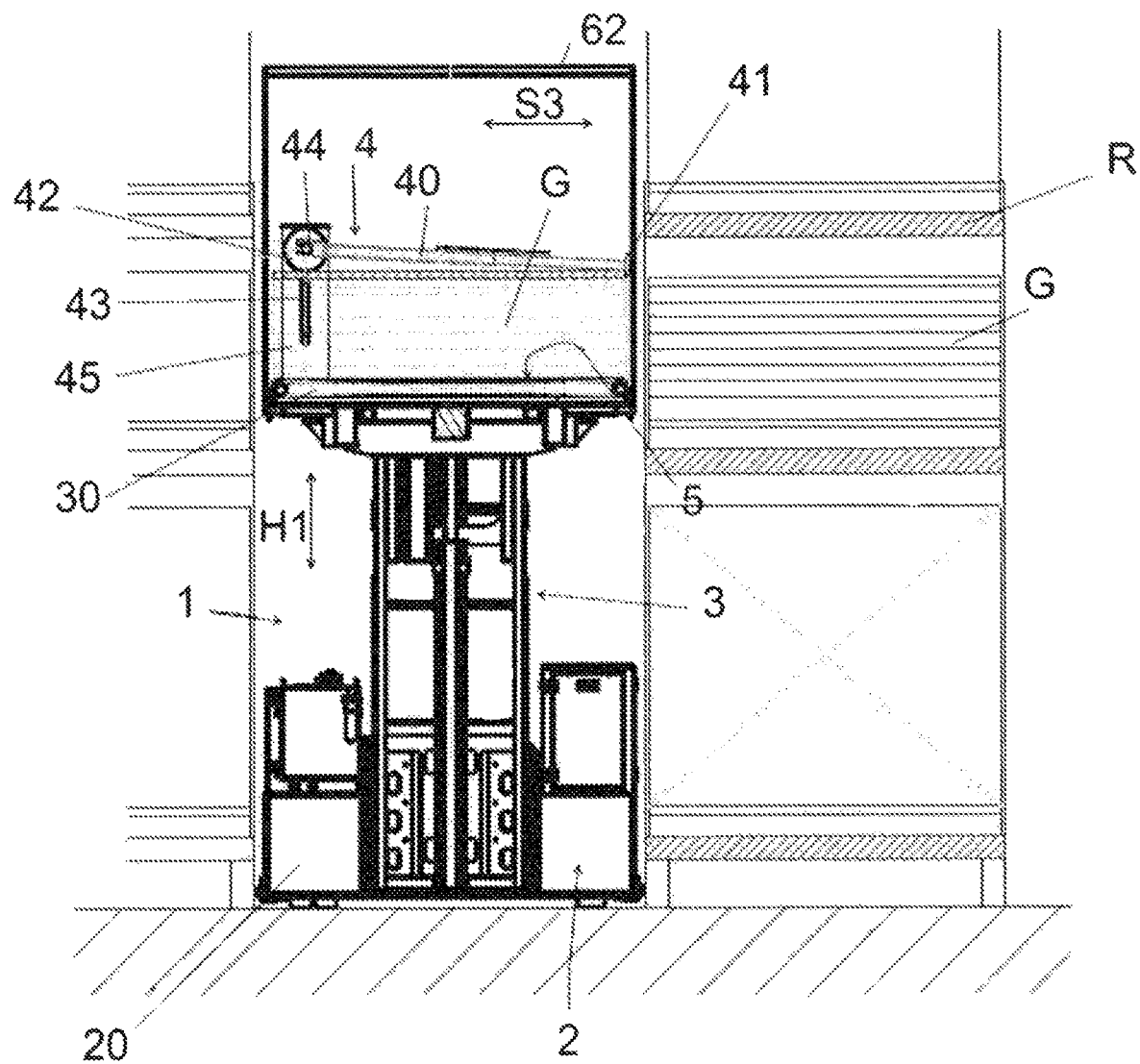
FIG. 9 shows the industrial truck during storage/retrieval of goods using the pushing device.

As shown in FIG. 8, the pushing arm 40 is then displaced in the direction out of the rack bay R by the actuator 45 being displaced back, which in the process pushes the door element stacked uppermost in the rack bay R, by the pusher dog 41 which is engaged in the door element, in the direction of the transport platform 30. The pushed door elements thereby slides over door elements located therebelow. In this case, the clearance or distance between the door elements already stacked on the transport platform 30 and those in the rack R is sufficiently small that the pushed door element is transferred substantially horizontally, from the door stack located in the rack R onto the door stack of the transport platform 30.

Finally, the pushing arm 40 is pushed in or shortened again in the longitudinal extension thereof, in order not to protrude laterally from the industrial truck 1 or jam or get caught on a rack R during a subsequent movement of the transport platform 30 or of the industrial truck 1.

It should be clear that the use of the pushing arm is not limited to the described example of the door elements as goods, but can instead be used in the case of all goods, in particular stackable and extensive goods. Reference should also be had to the appended claims.

LIST OF REFERENCE NUMERALS 1 industrial truck
2 main chassis
20 body
21 wheel
22 lifting mast
22a first lifting mast
22b second lifting mast
3 lifting device
30 transport platform
4 pushing device
40 pushing arm
41 pusher dog
42 caster, roller
43 vertical slot
44 shaft
45 actuator
5 shifting device
50 initial lifting device
51 scissors lifting mechanism
52 support rail device
53a support rail
53b support rail
54 initial lift
6 control station
6a first control station
6b second control station
61 railing
62 canopy
H1 raising/lowering of transport platform
H2 raising/lowering of support rail
H3 raising/lowering of pushing device
S1 longitudinal displacement of support rail
S2 transverse displacement of support rail
S3 longitudinal displacement of pushing arm
S4 transverse displacement of pushing arm
F main direction of travel of industrial truck
G goods item, goods
OG upper face of goods item
P pallet
R rack, rack bay
L building, high-bay warehouse

What is claimed is:

1. An industrial truck comprising:
   a main chassis;
   a transport platform configured to transport goods;
   a lifting device configured to raise and lower the transport platform; and
   a pushing device comprising at least one pushing arm which is configured to be actuatable, the pushing device being configured to displace the goods relative to the transport platform,
   wherein,
   the transport platform comprises a shifting device which is configured to shift the goods relative to the transport platform, the shifting device comprising at least one of,
      an initial lifting device which is configured to raise and to lower the goods relative to the transport platform, and
      a support rail device which is configured to laterally relocate the goods relative to the transport platform.

2. The industrial truck as recited in claim 1, wherein the at least one pushing arm is arranged above the transport platform.

3. The industrial truck as recited in claim 1, wherein,
   the at least one pushing arm comprises a longitudinal extension, and
   the at least one pushing arm is configured to be at least one of displaceable and length-adjustable at least in a direction of the longitudinal extension.

4. The industrial truck as recited in claim 3, wherein the at least one pushing arm further comprises a pusher dog which contacts on one of the goods during a displacement thereof.

5. The industrial truck as recited in claim 1, wherein the pushing device further comprises at least one caster which is connected to the at least one pushing arm, the at least one caster being configured to roll along the transport platform or along an upper face of one of the goods when the at least one pushing arm is displaced.

6. The industrial truck as recited in claim 1, wherein the pushing device is further configured to be movable in both in a vertical direction and in a horizontal direction relative to at least one of the main chassis and the transport platform.

7. The industrial truck as recited in claim 1, further comprising:
   a support rail device,
   wherein, the support rail device comprises at least one support rail which is arranged to be at least one of displaceable and length-adjustable in at least one substantially horizontal direction.

8. The industrial truck as recited in claim 1, further comprising:
at least one control station which is configured to be height-adjustable relative to at least one of the main chassis and the transport platform.

9. The industrial truck as recited in claim 8, further comprising:
a railing arranged between the at least one control station and the transport platform, the railing being height-adjustable relative to the at least one control station.

10. The industrial truck as recited in claim 1, wherein the transport platform configured to receive large components.

11. The industrial truck as recited in claim 10, wherein the goods are door elements.

* * * * *